US009894532B2

(12) United States Patent
Nguyen et al.

(10) Patent No.: US 9,894,532 B2
(45) Date of Patent: Feb. 13, 2018

(54) APPARATUS AND METHOD OF PROVIDING MACHINE TYPE COMMUNICATION

(71) Applicant: NEC Corporation, Tokyo (JP)

(72) Inventors: Phong Nguyen, Victoria (AU); Satha Sathananthan, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/357,600

(22) PCT Filed: Nov. 8, 2012

(86) PCT No.: PCT/JP2012/079579
§ 371 (c)(1),
(2) Date: May 12, 2014

(87) PCT Pub. No.: WO2013/077235
PCT Pub. Date: May 30, 2013

(65) Prior Publication Data
US 2014/0341141 A1 Nov. 20, 2014

(30) Foreign Application Priority Data
Nov. 25, 2011 (AU) ................................ 2011904923

(51) Int. Cl.
H04W 16/14 (2009.01)
H04W 4/00 (2009.01)
(Continued)

(52) U.S. Cl.
CPC ............. *H04W 16/14* (2013.01); *H04L 5/001* (2013.01); *H04L 5/0053* (2013.01);
(Continued)

(58) Field of Classification Search
CPC .... H04W 4/005; H04W 72/0453; H04L 5/001
See application file for complete search history.

(56) References Cited

U.S. PATENT DOCUMENTS 9,258,807 B2 * 2/2016 Choi ..................... H04L 5/0007
2007/0054667 A1 * 3/2007 Lee ..................... H04L 12/5695
455/434

(Continued)

FOREIGN PATENT DOCUMENTS

CA    2 756 776 A1    9/2010
CN    102202375 A     9/2011

(Continued)

OTHER PUBLICATIONS

"Toward Ubiquitous Massive Accesses in 3GPP Machine-to-Machine Communications" by Lien, Chen and Lin. Apr. 5, 2011. Published in IEEE Communications Magazine, vol. 49, Issue: 4, Apr. 2011.*

(Continued)

*Primary Examiner* — Xavier Szewai Wong
(74) *Attorney, Agent, or Firm* — Wilmer Cutler Pickering Hale & Dorr

(57) ABSTRACT

In a wireless communications network providing a machine-type communications (MTC) service, a portion of a frequency spectrum is allocated to a MTC device to communicate between a base station and other MTC devices. MTC system information is transmitted/received from/to the MTC device through the portion of the frequency spectrum and may include channel information. The portion of the frequency spectrum may be used for a Long Term Evolution (LTE) wireless communication network.

17 Claims, 10 Drawing Sheets

(51) Int. Cl.
*H04W 72/04* (2009.01)
*H04L 5/00* (2006.01)
*H04W 48/10* (2009.01)
*H04L 5/14* (2006.01)

(52) U.S. Cl.
CPC .......... *H04L 5/0094* (2013.01); *H04W 4/005* (2013.01); *H04W 72/0453* (2013.01); *H04L 5/1469* (2013.01); *H04W 48/10* (2013.01)

(56) References Cited

U.S. PATENT DOCUMENTS

| | | | |
|---|---|---|---|
| 2010/0246518 A1 | 9/2010 | Gheorghiu et al. | |
| 2011/0199905 A1 | 8/2011 | Pinheiro et al. | |
| 2011/0235558 A1* | 9/2011 | Diachina | H04W 48/02 370/310 |
| 2011/0268046 A1* | 11/2011 | Choi | H04L 5/0007 370/329 |
| 2012/0004003 A1* | 1/2012 | Shaheen | H04W 4/005 455/509 |
| 2012/0263247 A1* | 10/2012 | Bhattad | H04L 25/0202 375/260 |
| 2012/0294168 A1* | 11/2012 | Freda | H04B 1/0067 370/252 |
| 2013/0114587 A1* | 5/2013 | Khoryaev | H04L 5/0094 370/343 |
| 2013/0288698 A1* | 10/2013 | Rune | H04W 52/0216 455/452.1 |
| 2015/0327270 A1* | 11/2015 | Iwai | H04L 5/0037 370/329 |

FOREIGN PATENT DOCUMENTS

| | | |
|---|---|---|
| WO | WO-2010/111429 A2 | 9/2010 |
| WO | WO-2011/052190 A1 | 5/2011 |
| WO | WO-2011/087826 A1 | 7/2011 |

OTHER PUBLICATIONS

Extended European Search Report issued by the European Patent Office in European Application No. 12852145.7 dated Feb. 3, 2015 (7 pgs.)
Fujitsu, "Support of MTC UE Having Narrower Rx/Tx Bandwidths than the Serving Cell's," 3GPP TSG-RAN EG1 Meeting #67, R1-114188. Nov. 14-18, 2011, San Francisco, CA (2 pgs.)
Huawei, HiSilicon, "Considerations on the Bandwith Reduction for Low Cost MTC UE," 3GPP TSG RAN WG1#67, R1-113659, Nov. 14-18, 2011, San Francisco, USA (6 pgs.)
Lien, S. and Chen, K., "Toward Ubiquitous Massive Accesses in 3GPP Machine-to-Machine Communication," IEEE Communications Magazine, vol. 49, No. 4, pp. 66-74 (Apr. 2011).
Japanese Office Action issued in corresponding Japanese Patent Application No. 2014-525208, dated Mar. 15, 2017, 4 pages.
LG Electronics Inc. "PDSCH Starting Symbol Indication for Cross-Carrier Scheduling", TSG-RAN WG1 Meeting #61, R1-102707, Montreal, Canada, May 10-14, 2010, 3 pages.
International Search Report corresponding to PCT/JP2012/079579 dated Jan. 29, 2013 (2 pages).
Alcatel-Lucent et al., Considerations on Potential Solutions for Low-Cost MTC UEs, 3GPP-TSG-RAN WG1#66b, R1-113334, Oct. 10, 2011 (4 pages).
Chinese First Office Action issued in corresponding Chinese Patent Application No. 201280057728.7, dated Dec. 30, 2016, 20 pages.
Ericsson, ST-Ericsson "Considerations on Use Cases for Additional Carrier Types", 3GPP TSG RAN WG1 Meeting #66, R1-112081, Athens, Greece, Aug. 22-26, 2010, 3 pages.
Japanese Office Action issued in corresponding Japanese Patent Application No. 2014-525208, dated Nov. 16, 2016, 7 pages.
Nokia, Nokia Siemens Networks "On Standards Aspects with Significant UE Cost Impact", 3GPP TSG-RAN WG1 Meeting #66bis, R1-113158, Zhuhai, China, Oct. 10-14, 2011, 5 pages.
NTT Docomo "Issues Regarding LTE Network for Low Cost MTC", 3GPP TSG RAN WG1 Meeting #67, R1-114082, San Francisco, USA, Nov. 14-18, 2011, 5 pages.

* cited by examiner

APPARATUS AND METHOD OF PROVIDING MACHINE TYPE COMMUNICATION

CROSS-REFERENCE TO RELATED APPLICATIONS

This application is a national stage application of International Application No. PCT/JP2012/079579 entitled "Apparatus and Method of Providing Machine Type Communication," filed on Nov. 8, 2012, which claims the benefit of the priority of Australian Patent Application No. 2011904923, filed on Nov. 25, 2011, the disclosures of each of which are hereby incorporated by reference in their entirety.

TECHNICAL FIELD

The present invention relates to an apparatus and method of providing machine type communication (MTC) over a Long Term Evolution (LTE) wireless communication network.

BACKGROUND ART

As Long Term Evolution (LTE) wireless communication networks evolve, network operators would like to reduce the cost of overall network maintenance by minimising the number of RATs (Radio Access Technologies). Machine-Type Communications (MTC), between MTC devices in the network, is a market that is likely to continue to expand in the future due to the rise of applications such as a smart metering, commercial fleet tracking, etc. transmitting and receiving data. In an example, many existing MTC devices (e.g. MTC User Equipments) are currently targeted at low-end (e.g. low average revenue per user, low data rate) applications that can be handled adequately by GSM/GPRS (Global System for Mobile communications/General Packet Radio Service) networks. Owing to the low cost of these MTC devices and the good coverage of GSM/GPRS, there has been very little motivation for MTC device suppliers to use modules that support the LTE radio interface. However, as more MTC devices are deployed in the wireless communication network, there will be an increased reliance on the existing GSM/GPRS networks. Thus, this will cost network operators not only in terms of maintaining multiple RATs but it will also prevent operators from reaping the maximum benefit out of their spectrum, especially given the non-optimal spectrum efficiency of GSM/GPRS.

Given the likely high number of MTC devices in the future, the overall resource they will need for service provision may be significant and inefficiently assigned. Therefore, it is desirable to provide, for example, a low cost and low power MTC device which has a simple operational procedure to enable low operational cost to MTC operators and which can facilitate migration of MTC devices from the GSM/GPRS networks to LTE networks.

DISCLOSURE OF THE INVENTION

In a first aspect of the present invention there is provided a method implemented in a base station used in a wireless communications network providing a machine-type communications (MTC) service, comprising:
allocating a portion of a frequency spectrum for the MTC service; and
transmitting MTC system information to a first MTC device,
wherein the MTC system information comprises channel information for the portion of the frequency spectrum, and
wherein the first MTC device communicates according to the channel information.

In a second aspect of the present invention, there is provided the method according to the first aspect, wherein the portion of the frequency spectrum comprises a fragmented frequency spectrum.

In a third aspect of the present invention, there is provided the method according to the second aspect, wherein the fragmented frequency spectrum is dedicated for the MTC service.

In a fourth aspect of the present invention, there is provided the method according to any one of the first through the third aspects, wherein data to or from the first MTC device is transmitted on the portion of the frequency spectrum.

In a fifth aspect of the present invention, there is provided the method according to any one of the first through the fourth aspects, wherein the MTC system information is transmitted on the portion of the frequency spectrum.

In a sixth aspect of the present invention, there is provided the method according to any one of the first through the fifth aspects, wherein the MTC system information comprises MTC cell information indicative of one or more cells of the wireless communication network.

In a seventh aspect of the present invention, there is provided the method according to the sixth aspect, wherein the MTC cell information comprises master information block (MIB) information, according to which the first MTC device communicates over the wireless communications network.

In an eighth aspect of the present invention, there is provided the method according to any one of the first through the seventh aspects, wherein the portion of the frequency spectrum has a 1.4 MHz bandwidth.

In a ninth aspect of the present invention, there is provided the method according to any one of the first through the eighth aspects, wherein the MTC system information further comprises:
control and scheduling information for a second MTC device.

In a tenth aspect of the present invention, there is provided the method according to the ninth aspect, wherein the first MTC device communicates with the second MTC device, according to the control and scheduling information.

In an eleventh aspect of the present invention, there is provided the method according to the tenth aspect, wherein the control and scheduling information comprises information about whether the second MTC devices is a master or a slave.

In a twelfth aspect of the present invention, there is provided the method according to any one of the first through the eleventh aspects, wherein the first MTC device comprises a single antenna.

In a thirteenth aspect of the present invention, there is provided the method according to any one of the first through the twelfth aspects, wherein the first MTC device comprises multiple antennas.

In a fourteenth aspect of the present invention, there is provided a method implemented in a machine-type communications (MTC) device used in a wireless communications network providing an MTC service, comprising:
receiving MTC system information from a base station allocating a portion of a frequency spectrum for a MTC service; and communicating according to channel information for the portion of the frequency spectrum, wherein the MTC system information comprises the channel information for the portion of the frequency spectrum.

In a fifteenth aspect of the present invention, there is provided a wireless communications network providing a machine-type communications (MTC) service, comprising:

a base station allocating a portion of a frequency spectrum for the MTC service; and a MTC device receiving MTC system information from the base station, wherein the MTC system information comprises channel information for the portion of the frequency spectrum, and wherein the MTC device communicates according to the channel information.

In a sixteenth aspect of the present invention, there is provided a method implemented in a machine-type communication (MTC) device used in a wireless communications network providing an MTC service, comprising:

performing cell search to find a cell;

receiving a master information block (MIB) on a primary carrier component (PCell);

decoding the MIB; and switching to a secondary carrier component, in case the cell supports MTC and the secondary carrier component (SCell) dedicated to MTC is enabled.

In a seventeenth aspect of the present invention, there is provided the method according to the sixteenth aspect, wherein the primary carrier component has a 1.4 MHz bandwidth.

In an eighteenth aspect of the present invention, there is provided the method according to the sixteenth or seventeenth aspect, wherein the MTC device is requested to switch to the secondary carrier component.

In a nineteenth aspect of the present invention, there is provided the method according to any one of the sixteenth through the eighteenth aspects, wherein the MTC device maintains at least one of time synchronisation and frequency synchronisation with the secondary carrier component.

In a twentieth aspect of the present invention, there is provided the method according to the nineteenth aspect, wherein the synchronisation is performed using at least one of a secondary synchronisation signal (SSS) and a cell reference signal (CRS).

In a twenty-first aspect of the present invention, there is provided the method according to the sixteenth through the twentieth aspects, further comprising:

receiving a physical broadcast channel (PBCH) on the secondary carrier component; and decoding the PBCH for MIB update.

Specifically, in an embodiment, the portion of the frequency spectrum comprises a fragmented frequency spectrum comprising fragments having too small bandwidth for communication by LTE User Equipments (LTE UEs) in the LTE wireless communication network. In an embodiment, the portion of the frequency spectrum comprises a 1.4 MHz bandwidth (e.g. a virtual bandwidth). It will be appreciated by those persons skilled in the art that over bandwidths are envisaged such as 2 MHz.

In an embodiment, the method further comprises dedicating the fragmented frequency spectrum for communication of the MTC devices in the LTE wireless communication network.

In another embodiment, the method further provides radio access for MTC devices in the network to operate in the frequency spectrum allocated to LTE as well as in the fragmented frequency spectrum that can be utilised and dedicated to LTE based MTC devices. In this embodiment, the method enables the MTC devices to receive and transmit data on the exiting frequency spectrum allocated to LTE without creating any impact to the LTE's UE operating in the same cell or on the fragmented frequency spectrum dedicated to MTC.

In an embodiment, the method further comprises allocating and mapping a dedicated channel of the portion of the frequency spectrum for carrying transmitted and/or received data to/from the MTC devices. In another embodiment, the method further comprises allocating and mapping a further dedicated channel of the portion of the frequency spectrum for carrying the MTC system information. For example, the method includes defining a fixed control region and its control channels, as well as their mapping within the configurable allocated bandwidth. In the example, the method further comprises defining frame and subframe structures within the allocated bandwidth for MTC related physical channel mapping. Also, the dedicated channel and/or the further dedicated channel carries MTC L1/L2 control signalling and MTC L1 data.

In an embodiment, the LTE network comprises one or more cells and the method further comprises modifying existing LTE cell system information to indicate whether a particular cell supports MTC to be communicated (e.g. broadcasted) to the MTC devices.

In an embodiment, LTE based MTC devices are low cost and have low power requirements to operate within the existing LTE network without significantly impacting on legacy LTE UEs. For example, by allocating and mapping the physical channel carrying MTC system (e.g. control) information within the allocated (e.g. virtual) bandwidth, the MTC's radio frame configuration and group schedule assignments allow the MTC devices to enable efficient DRX (discontinues reception) and/or DTX (discontinuous transmission) to conserve MTC device power.

Also, these LTE based MTC devices can operate on a designated frequency spectrum, which is too small for normal LTE operation but sufficient for low data rate MTC devices, to allow for a network operator to utilise fragmented spectrum more efficiently. The MTC devices can use the fragmented spectrum as it is envisaged that they communicate over the LTE network in infrequent and small data burst transmissions.

In an embodiment, the method further comprises configuring the MTC system information to comprise control and scheduling information for configuring proximate ones of the MTC devices in the LTE wireless communication to communicate data directly with each other. In an embodiment, the control and scheduling information comprises information configuring one of the proximate MTC devices to be a MASTER and another of the proximate MTC devices to be a SLAVE so as to schedule data communication between the respective proximate MTC devices. Thus, for example, a LTE based MTC network is deployed for communication between MTC devices, which also have low power consumption as well as low maintaining costs in order to help reduce operational cost to the network operators. That is, the LTE based MTC network provides the capability to off load network data traffic between proximal MTC devices (e.g. direct communication between MTC devices) from the LTE network. Additionally or alternatively, the MTC network enables the network operator to maintain control of charging for the amount of offloaded data traffic between the proximal MTC devices.

In an embodiment, the MTC system information comprises MTC cell information indicative of one or more cells of the LTE wireless communication network providing MTC services for the MTC devices. In the embodiment, the MTC cell information comprises Master Information Block (MIB) information so that the MTC devices can be configured to access the LTE wireless communication network to transmit and/or receive data over the LTE wireless communication network.

In another embodiment of the present invention, there is provided a Machine-Type Communication (MTC) device for communicating over a Long Term Evolution (LTE) wireless communication network, the device comprising:

a RF unit for receiving and transmitting MTC system information comprising channel information of an allocated portion of a frequency spectrum of the LTE wireless communication network for the MTC device to communicate over the LTE wireless communication network; and a processor for processing the MTC system information to configure the MTC device to transmit and/or receive data over the LTE wireless communication network based on the channel information.

In an embodiment, the RF unit is a single RF unit and the processor a low clock-rate processor having low power consumption.

In an embodiment, the Long Term Evolution (LTE) wireless communication network comprises Release11 LTE. It will be appreciated by those persons skilled in the art that the MTC devices can operate on other release LTE's, particularly beyond Release11.

BRIEF DESCRIPTION OF THE DRAWINGS

Embodiments of the present invention will now be described, by way of example only, with reference to the accompanying drawings, in which.

DESCRIPTION OF EXEMPLARY EMBODIMENTS

Figure 1:
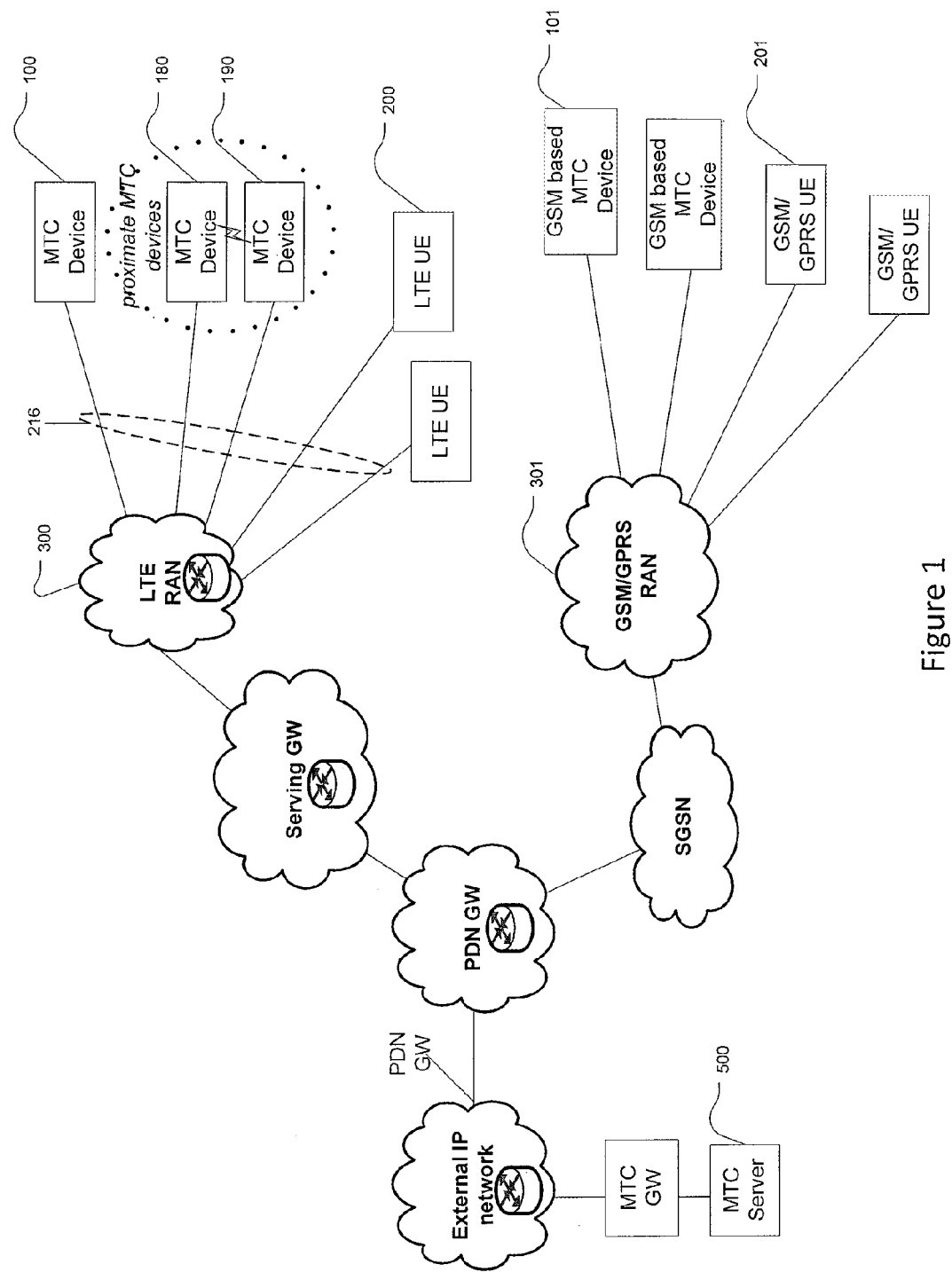
FIG. 1 is a schematic illustration of a wireless communication system supporting Machine-Type Communications (MTC) devices according to an embodiment of the present invention.

According to an embodiment, there is provided an LTE wireless communication system as shown in FIG. 1. The system provides MTC radio access in a wireless communication network and includes LTE based MTC devices 100, 180, and 190 which communicate with each other or with a MTC server 500 via a LTE wireless communication network, namely, LTE Radio Access Network (LTE RAN 300). The system also includes GSM/GPRS based MTC devices 101 which communicate with the MTC server 500 via a GSM/GPRS wireless communication network (GSM/GPRS RAN 300). In an embodiment described above, the LTE based MTC devices 100, 180, and 190 are low cost devices which have low power requirements and operate within the LTE wireless communication network.

It can be seen from FIG. 1 that proximate MTC devices 180 and 190 are configured to communicate directly with each other in addition, or in the alternative, to communicating via the LTE RAN 300. In this Figure, these MTC devices 180 and 190 are configured to directly send data to each other via a direct radio link, which is controlled by the LTE RAN 300. In another embodiment, the radio link is controlled by one of the MTC devices 180 and 190. In any event, it will be appreciated by those persons skilled in the art that the LTE RAN 300 is configured to provide both a radio communication interface 216 for all the LTE based MTC devices 100, 180, and 190 as well as to legacy LTE UEs 200. Also, it will be appreciated that the LTE RAN 300 comprises information to determine a group of MTC devices in data communication therewith (e.g. MTC devices 180 and 190) based one or more shared features, such as proximity. This information can be determined and transmitted by one of the MTC devices 180 and 190 or can be predetermined and stored in a memory in a processing unit of the LTE RAN 300.

Figure 2:
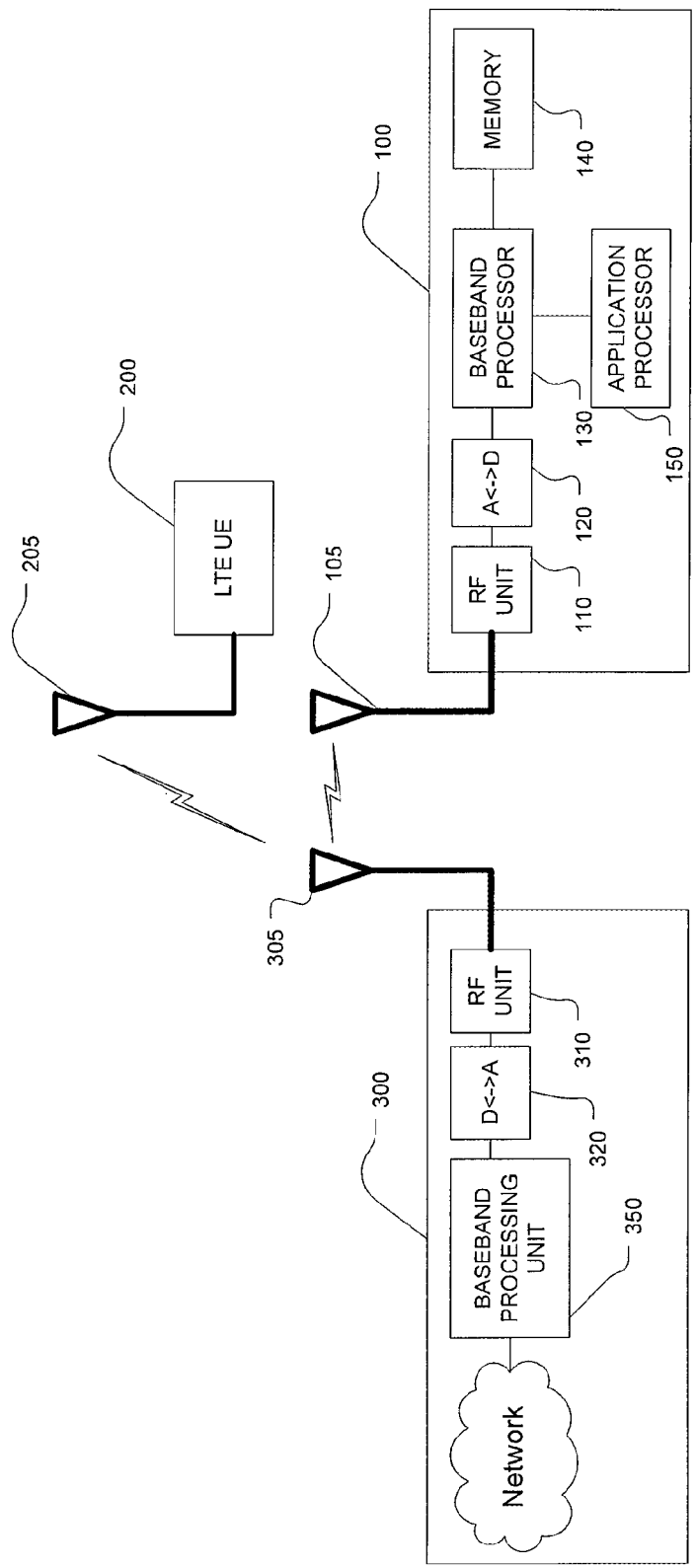
FIG. 2 is a simplified schematic diagram of a wireless communication system supporting MTC devices within existing Long Term Evolution (LTE) wireless communication operation spectrum according to an embodiment of the present invention.

FIG. 2 shows the LTE based MTC device 100 and the LTE RAN 300 in further detail. It can be seen that, in this embodiment, the MTC device 100 includes an RF Unit 110, with a single physical antenna 105 operable in the nominal narrow band bandwidth of 1.4 MHz for LTE cell search and Master Information Block (MIB) reception. The MIB comprises a number of the most frequently transmitted parameters essential for initial access to one of the cells of the LTE RAN 300. The narrow band bandwidth of 1.4 MHz also reduces RF development costs. Nonetheless, it will be appreciated by those persons skilled in the art that other narrow band bandwidths can be used by the system.

The MTC device 100 also includes an A-D converter 120, with a minimum sampling rate of 1.92 MHz to minimise processing power, and a Baseband Processor 130 with a low clock rate for processing 2.88×105 I/Q symbols per second. In another arrangement, the Processor 130 is also able to shut down the reception and/or transmission of data during predefined idle subframe(s) to conserve power consumption so that the device 100 consumes less power. Also, the device 100 includes a Memory 140 with a size that is sufficient for baseband signal processing and an Application Processor 150 for processing MTC applications.

The LTE based MTC device 100 operates within a broadband LTE wireless network or system by communicating with the LTE RAN 300, as shown in more detail in FIG. 2. Also, the legacy LTE UE 200 communicates with the LTE RAN 300 in the usual fashion (e.g. voice and/or data communication over the LTE RAN 300 between UEs). It can also be seen in this Figure that only a single antenna transmission or transmit diversity transmission and single antenna reception is supported by the MTC device 100 in downlink transmission; however, multiple antenna transmission is also envisaged. It will be appreciated by those persons skilled in the art that, in order to achieve a low cost LTE based MTC device, it is desirable that the LTE based MTC device has a single receive/transmit antenna to reduce RF cost. This MTC device still supports DL (Down Link) transmit diversity in order to be able to receive PBCH (Physical Broadcast Channel) (which carries the MIB (Master Information Block)).

As illustrated, the system of FIG. 2 includes the LTE RAN 300, the LTE-UE 200, and the low cost and low bandwidth LTE based MTC device 100 described above. In order to enable the low bandwidth (e.g. 1.4 MHz) LTE based MTC device 100 to operate within the LTE network, generally with a system bandwidth of, say, 1.4, 3, 5, 10, 15 or 20 MHz, the following procedure is applied. Firstly, the LTE based MTC device(s) 100 performs cell search and MIB reception of the LTE RAN 300, which comprising one or more cells, and decodes the MIB on the 1.4 MHz system Bandwidth (BW). Upon decoding the MIB, the MTC device 100 is able to determine:

cell operational BW information (e.g. System BW>10 RB (Resource Block) or System BW≤10 RB)
if the cell supports MTC devices 100
if the MTC devices 100 are supported on a primary carrier component (Pcell) of the cell or a secondary carrier component (SCell) of the cell.

If the detected cell is supporting MTC on the primary carrier (PCell), the LTE based MTC 100 device will camp on this cell. The LTE RAN (300) is then informed of the MTC device(s) 100 camping on a particular cell within its coverage and configures the central 1.4 MHz BW as a virtual narrow BW allocated to MTC traffic. In addition, it is envisaged that this central 1.4 MHz virtual narrow BW can be shared with other LTE UEs subject to cell traffic load.

On the 1.4 MHz BW, the LTE RAN 300 reserves the central six Resource Blocks (RBs) of subframe #0 (applicable for both FDD (Frequency Division Duplex) and TDD (Time Division Duplex)) for the transmission of MTC system information. The MTC system information includes, but is not limited to, the following information:

Radio Frame configuration information providing a radio frame and its associated subframes allocated for MTC traffic
group information of LTE based MTC devices 180 and 190, which are allowed to access the network using an allocated radio frame configuration
Physical Hybrid-ARQ Indicator Channel (mPHICH) configuration information
MTC system information, which is transmitted using the same transmission mode as Physical Broadcast Channel (PBCH).

The Radio Frame configuration information is then configurable by the LTE RAN 300, depending on MTC device priority and MTC traffic and the LTE RAN 300 is also configured to receive the MTC system information. With the reference to FIGS. 3A and 3B (FDD-type1) and FIGS. 4A and 4B (TDD-type2), it can be seen that the MTC system information is mapped on:

normal CP (Cyclic Prefix) subframes
OFDM symbols which are not occupied by PSS (Primary Synchronization Signal), SSS (Secondary Synchronization Signal) (for type 1 frame structure) and PBCH
OFDM symbol #4 onward if the system BW>10 RBs or OFDM symbol #5 onward if the system BW≤10 RBs
RE(s) which are not reserved for cell reference signal.

Also, on the 1.4 MHz BW, and within the subframes allocated to MTC traffic, the LTE RAN 300 reserves a fixed MTC control region nominal of three OFDM symbols for both transmitting the MTC Physical Downlink Control Channel (mPDCCH) and the MTC Physical Hybrid-ARQ Indicator Channel (mPHICH). The mPDCCH is used for downlink control information, mainly scheduling decisions, and is required for the reception of a MTC data channel (mPDSCH). It is also used for scheduling grant enabling transmission on an MTC uplink data channel (mPUSCH). The mPHICH is used or providing the MTC device 100 with information regarding whether a transport block should be retransmitted or not. In any case, the mPDCCH, mPHICH and mPDSCH are transmitted using the same transmission mode as the PBCH.

Figure 3A:
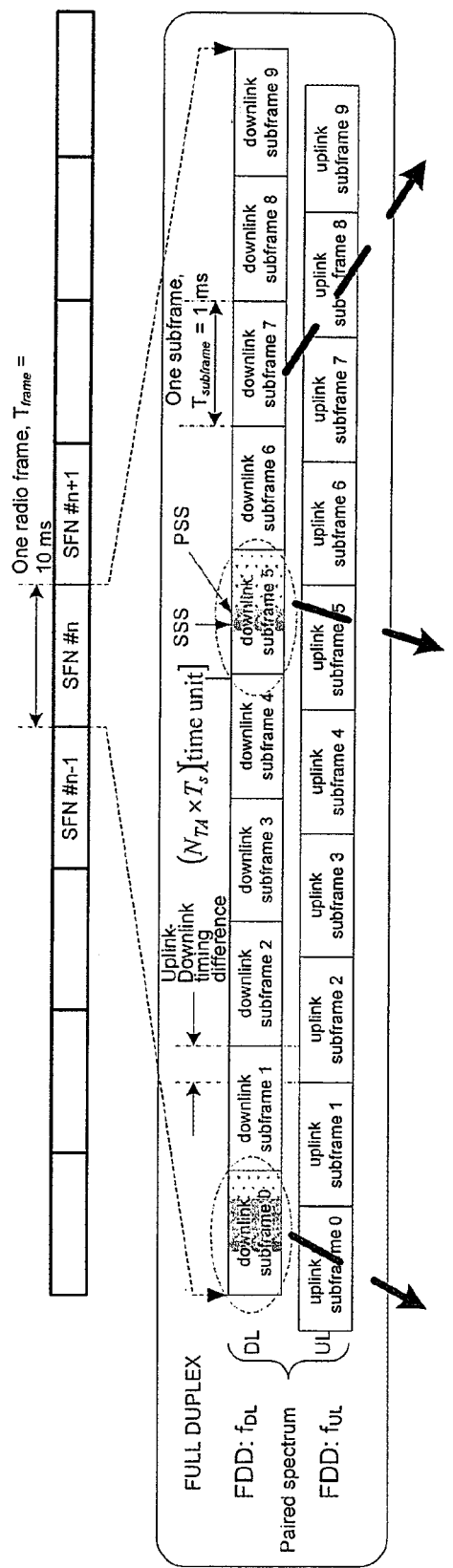
FIG. 3A is a schematic illustration of a frame structure and physical mapping for MTC for Frequency Division Duplexing (FDD) according to an embodiment of the present invention.
Figure 3B:
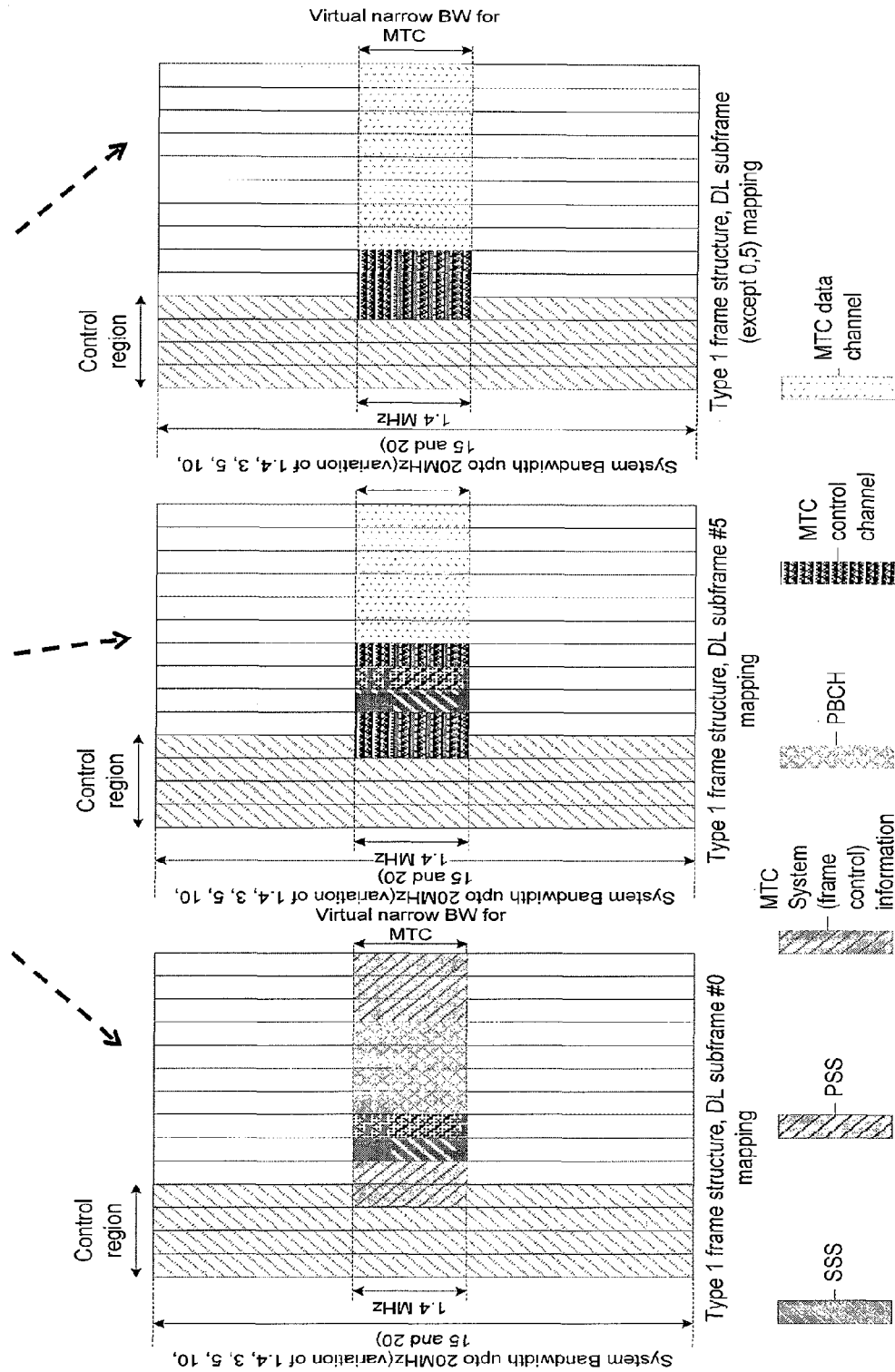
FIG. 3B is a further schematic illustration of the frame structure and physical mapping for MTC for Frequency Division Duplexing (FDD) of FIG. 3A.
Figure 4A:
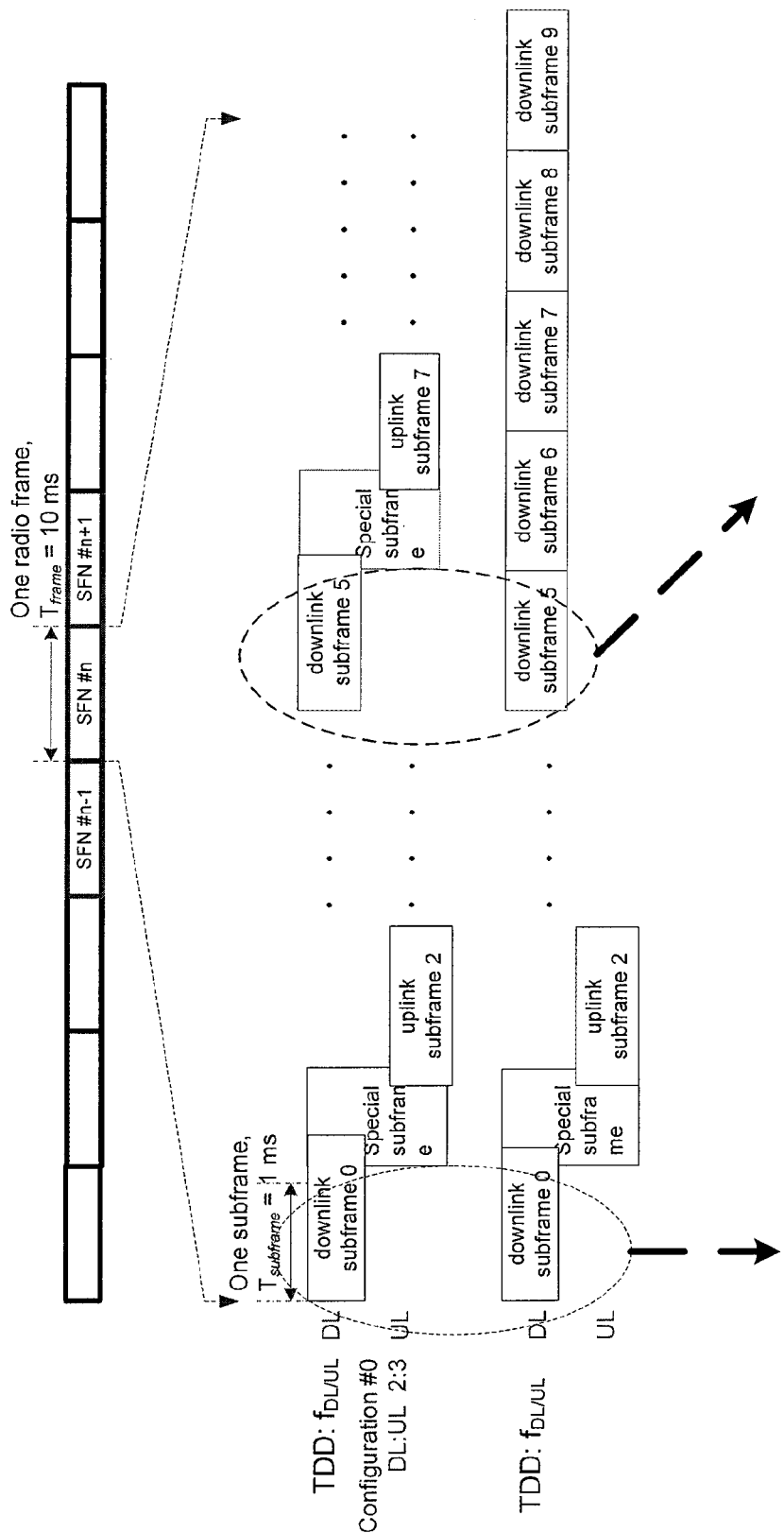
FIG. 4A is a schematic illustration of a frame structure and physical mapping for MTC for Time Division Duplexing (TDD) according to an embodiment of the present invention.
Figure 4B:
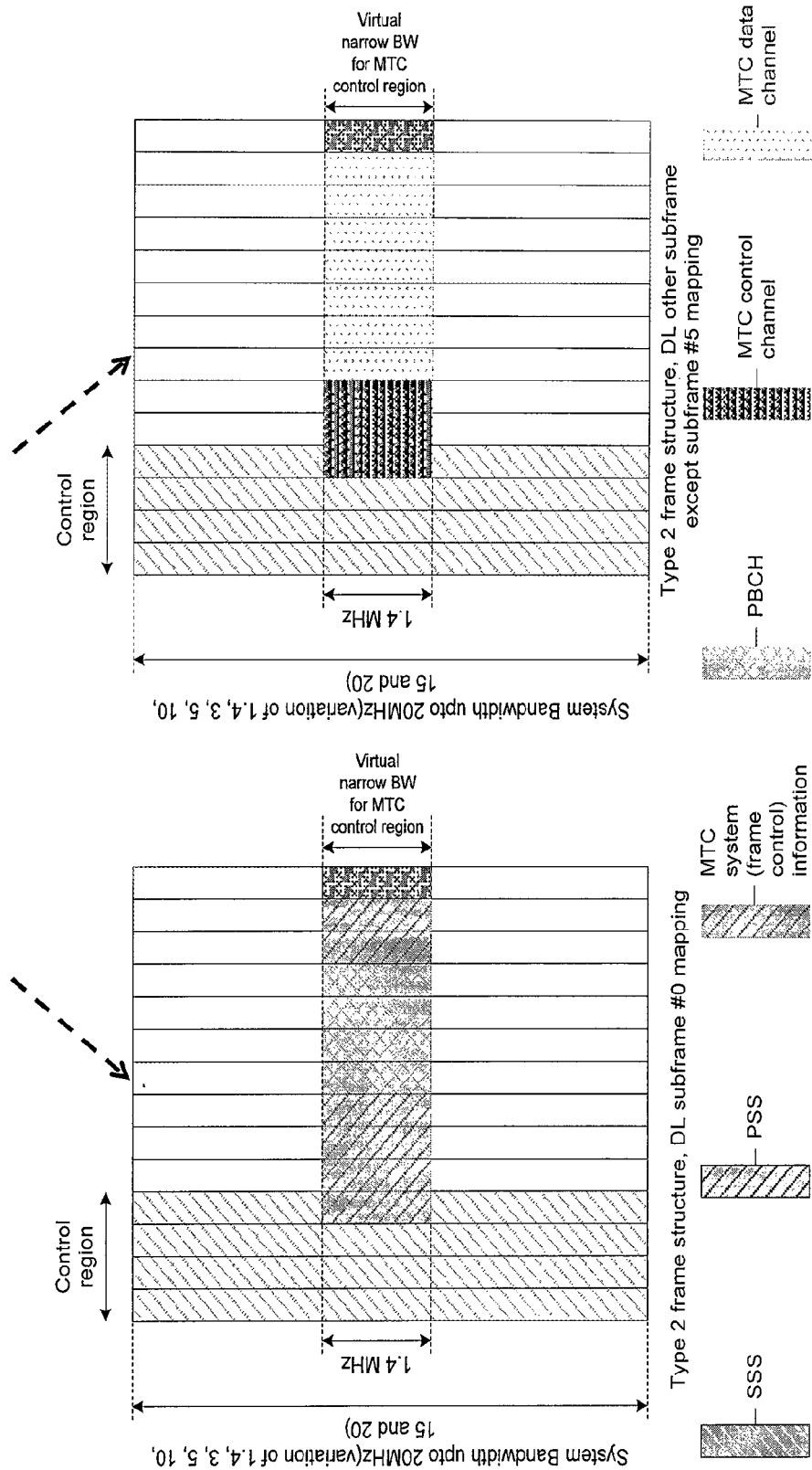
FIG. 4B is a further schematic illustration of the frame structure and physical mapping for MTC for Time Division Duplexing (TDD) of FIG. 4A.

Furthermore, it can be seen from FIGS. 3A and 3B (FDD-type1 frame structure) and FIGS. 4A and 4B (TDD-type2 frame structure) that subframes of radio frames are allocated to MTC traffic. Specifically, the MTC control region is mapped on:

subframes which are not special subframes for frame structure type2
OFDM symbol #4 onwards if the system BW>10 RBs or OFDM symbol #5 onwards if the system BW≤10 RBs
RE(s) (Resource Element(s)) which are not reserved for cell reference signal.

Also, on the subframes of a radio frame allocated to MTC traffic, the MTC data channel mPDSCH is mapped on:

subframes which are not special subframes for frame structure type2
remaining OFDM symbols of the MTC subframe
RE(s) which are not reserved for cell reference signal.

Figure 5:
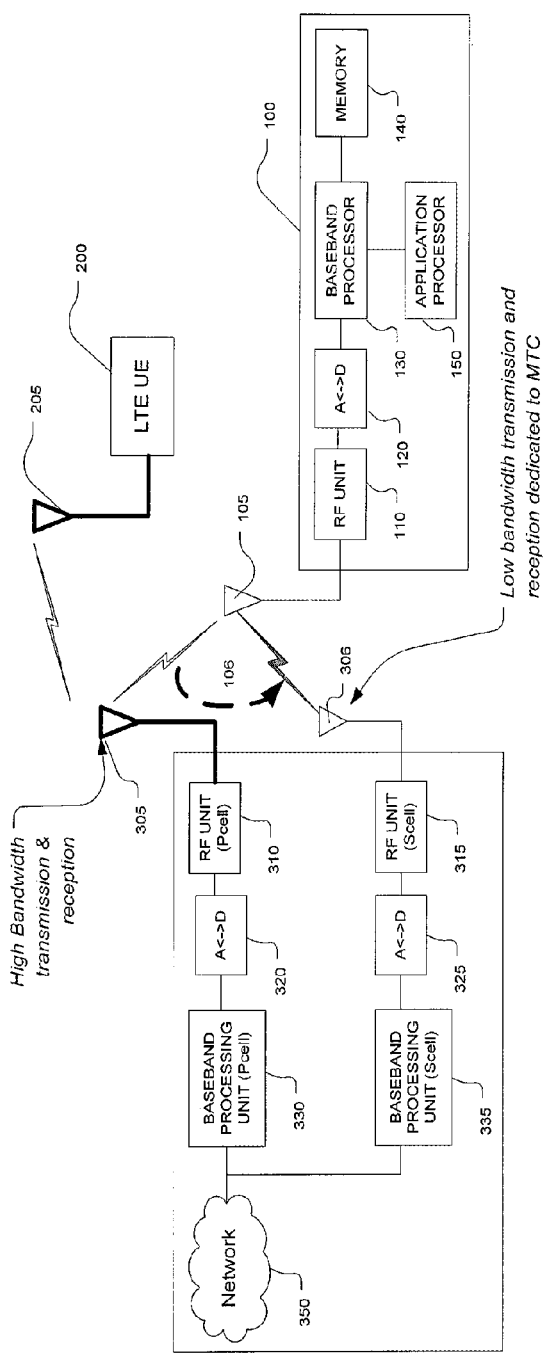
FIG. 5 is a simplified schematic illustration of a wireless communication system supporting MTC devices within a dedicated MTC carrier according to an embodiment of the present invention.

FIG. 5 shows an illustration of a wireless communication system supporting a MTC device 100 operating on a dedicated MTC carrier. The system comprises the LTE based MTC device 100 and the LTE RAN 300, which supports a primary carrier component accessible via antenna(s) 305, and a secondary carrier component, dedicated to MTC, accessible via antenna(s) 306. Also shown is the legacy LTE-UE 200 which communicates with the LTE RAN 300 over the primary carrier component accessible via the high bandwidth antenna 305. It can be seen that the secondary carrier component, dedicated to MTC, is a low bandwidth carrier.

In order to enable the LTE based MTC device 100 to operate on the low bandwidth carrier component dedicated to MTC, the following procedure is applied. Firstly, the LTE based MTC device(s) 100 perform cell search and MIB reception and decoding on 1.4 MHz system Bandwidth (BW) on the primary carrier component (PCell). In one arrangement, the MTC device 100 and/or the LTE UE 200 cannot detect the low bandwidth secondary carrier because PSS is disabled. Upon decoding the cell MIB, the LTE based MTC device is able to determine:
cell operational BW information (e.g. System BW>10 RB or System BW≤10 RB)
if the cell supports MTC devices
if the MTC device 100 is supported on the primary carrier component (PCell) or secondary carrier component (SCell).

If the detected cell supports MTC and the secondary carrier component (SCell) dedicated to MTC is enabled, the MTC device 100 may be requested to switch to the secondary carrier and camp on that SCell (see FIG. 5 arrow 106).

In an arrangement, on the MTC dedicated carrier component (SCell), the MTC device 100 is maintaining time and frequency synchronisation with the SCell using SSS(Secondary Synchronization Signal) and CRS (Cell Reference Signal). In the arrangement, the SCell's frame timing has a fixed timing offset with the PCell's frame timing and this is informed to MTC device 100 before switching occurs. The fixed timing offset shall allow time ICIC (Inter-cell interference coordination) between the PCell and SCell. The MTC device 100 is also receiving and decoding PBCH on SCell for MIB update.

Figure 6:
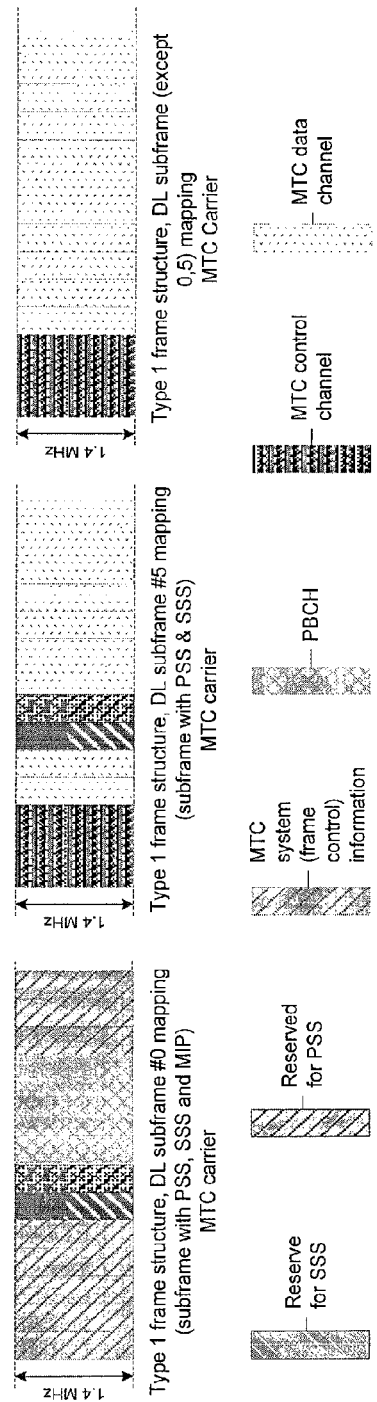
FIG. 6 is a schematic illustration of a frame structure and physical mapping for MTC for FDD on a dedicated MTC carrier according to an embodiment of the present invention.

Also on the MTC dedicated carrier component (SCell), the LTE RAN 300 is transmitting MTC system information on subframe #0. With reference to FIG. 6, the MTC system information on the MTC dedicated carrier component is mapped on all available REs which are not reserved for PSS, SSS, PBCH and CRS. The LTE RAN 300 is also transmitting MTC control channels including mPHICH and mPDCCH on the first three OFDM symbols of the remaining subframes including special subframe for Type2 frame structure, and transmitting MTC data channel (mPDSCH) on the remaining OFDM symbols which are not reserved for PSS, SSS (type1 frame structure) and on RE(s) which are not reserved for CRS.

Figure 7A:
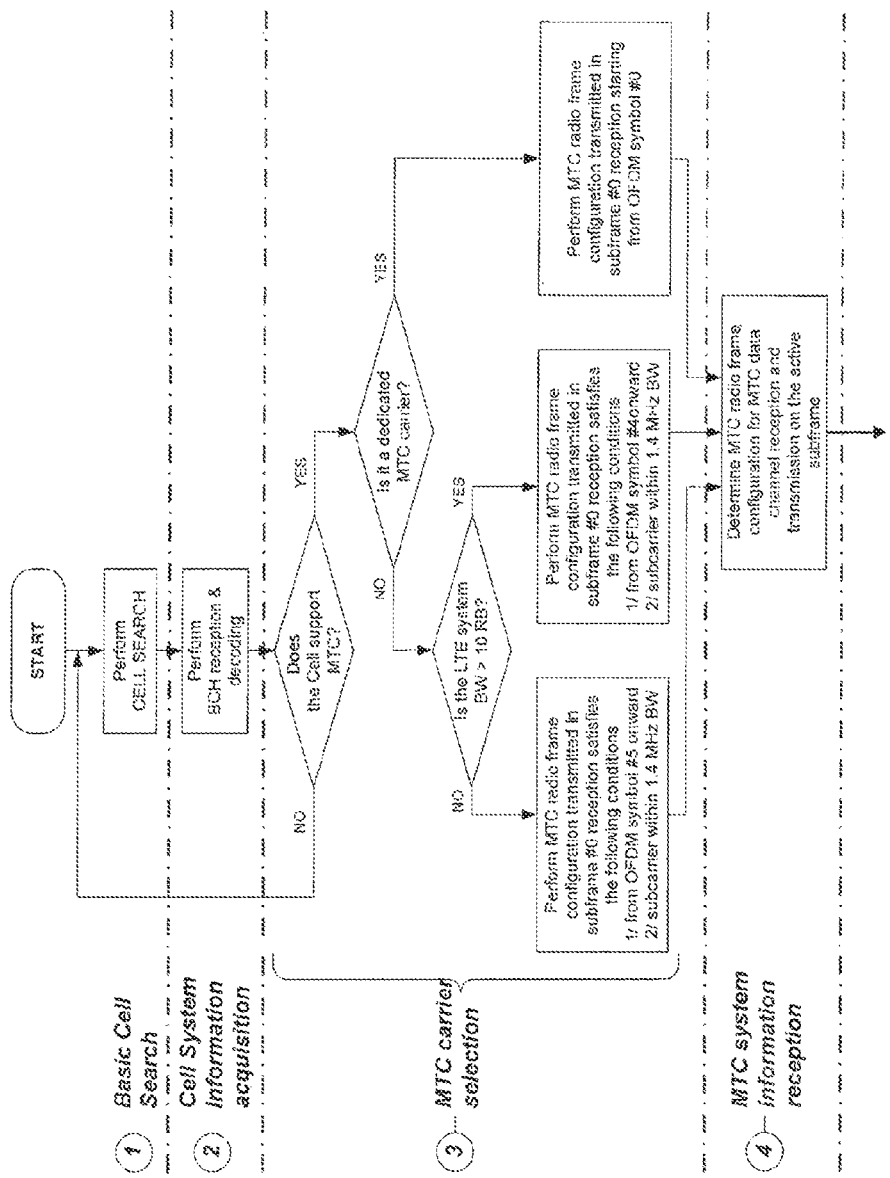
FIG. 7A is a flow chart of a Layer 1 access procedure for MTC data channel reception and transmission according to an embodiment of the present invention.
Figure 7B:
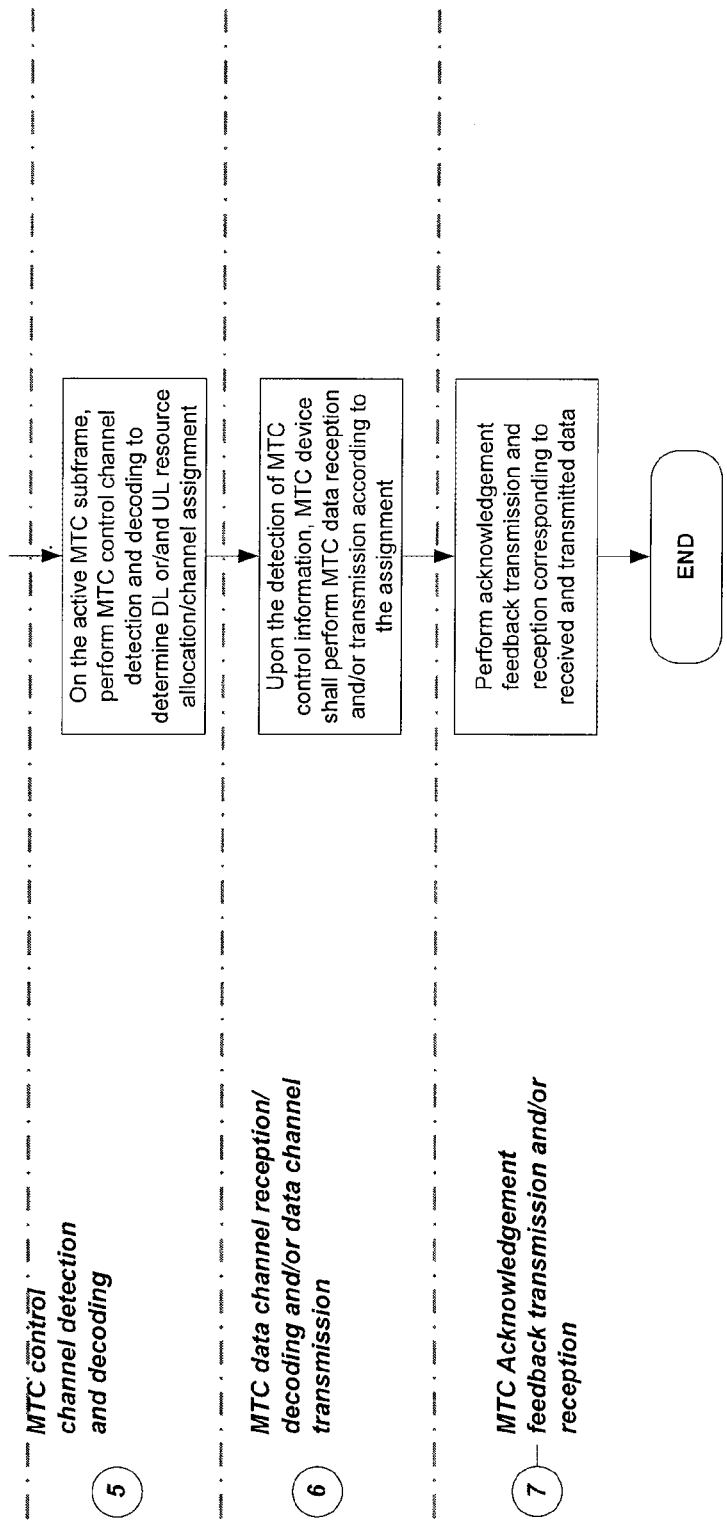
FIG. 7B is a further flow chart of the Layer 1 access procedure for MTC data channel reception and transmission of FIG. 7A.

The LTE based MTC device 100 also performs layer 1 data channel reception and/or transmission on the virtual BW of the PCell or dedicated BW on the SCell, as illustrated in FIGS. 7A and 7B. This procedure comprises seven steps.

Step 1: Basic Cell Search

The MTC device(s) 100 initiates a communication with the LTE RAN 300 network by performing a basic cell search procedure. This procedure comprises:
acquisition of frequency and symbol synchronisation information
duplex scheme acquisition of frame timing of the cell
determination of the physical-layer cell identity Step 2: Cell System information acquisition Upon the successful completion of the basic cell search operation, the MTC device 100 performs BCH reception and decoding to determine cell system information (MIB).

Step 3: MTC Carrier selection

Upon the successful reception of MIB, the MTC device 100 further determines the carrier component and associated radio frame structure for its MTC data channel (mPUSCH) transmission and/or mPDSCH reception.

Step 4: MTC system information reception

For the purpose of mPUSCH transmission and/or mPDSCH reception, the MTC device 100 performs reception and decoding of MTC system information transmitted periodically on DL subframe #0 to determine MTC subframes assignment specifically and applied to a group of MTC devices 100 as well as mPHICH configuration.

Step 5: MTC control channel detection and decoding

On a subframe(s) of the assigned MTC frame, the MTC device 100 performs the reception of MTC DL control channel (mPDCCH) and the detection of MTC Downlink Control information (mDCI).

Step 6: MTC data channel reception and/or transmission

Upon the successful detection of mDCI for mPDSCH reception, the MTC device 100 receives the associated mPDSCH on the same subframe. Also, additionally or alternatively, upon the successful detection of mDCI for mPUSCH transmission, the MTC device 100 transmits the associating mPUSCH on a future scheduled UL subframe.

Step 7: MTC Acknowledgement feedback transmission and/or reception

Upon the decoding of the mPDSCH, the MTC device 100 transmits an acknowledgement on the predefined MTC UL subframe. Also, additionally or alternatively, upon transmitting an mPUSCH, the MTC device 100 monitors the mPHICH on the predefined future DL subframe for the acknowledgement.

Figure 8:
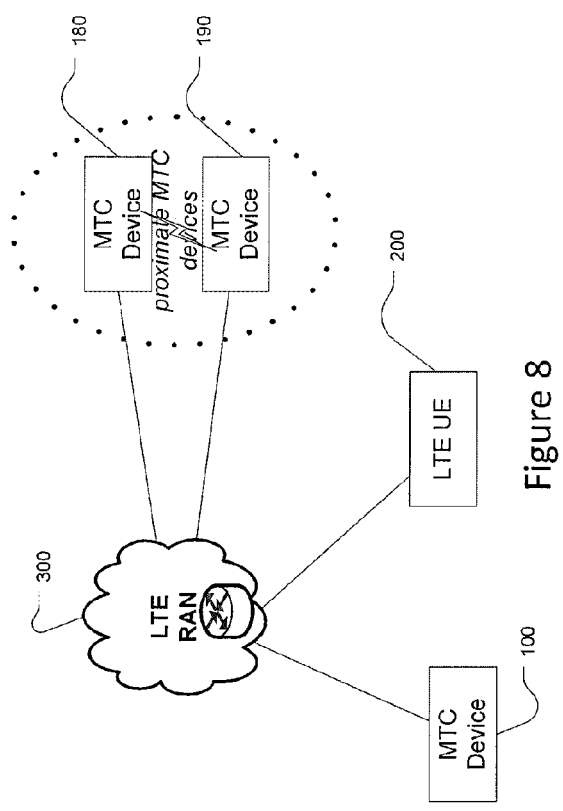
FIG. 8 is a simplified illustration of a wireless communication system supporting proximal MTC devices according to an embodiment of the present invention.

In another embodiment of the present invention, network traffic is offloaded by allowing at least two LTE based MTC devices 180 and 190 within a designated proximity (e.g. 100 m) to directly exchange data with each other, as shown in FIG. 1 and FIG. 8.

Figure 9:
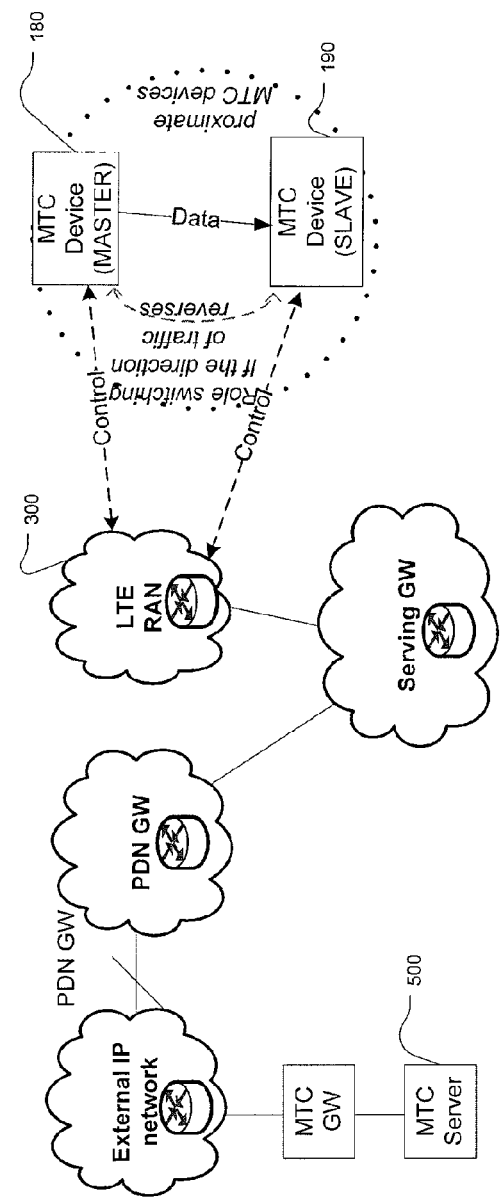
FIG. 9 is a simplified illustration of a wireless communication system supporting for network traffic offload by allowing direct data transfer between the proximal MTC devices proximal MTC devices according to an embodiment of the present invention.

It will be appreciated by those persons skilled in the art that as the LTE based MTC devices 100 support mobility, the possibility that two LTE based MTC devices 100, which require data exchange to each other, are within a designated proximity for direct data transmission is increased. With reference to the system illustrated in FIG. 9, the concept of network traffic offloading by allowing the two LTE based MTC devices 180 and 190 within a designated proximity to directly exchange data under the control of the LTE RAN 300 is described.

Upon the detection of one LTE based MTC device 180 being proximate to another LTE based MTC device 190 (e.g. 100 m) and the LTE based MTC device 180 has a need to transfer data to the LTE based MTC device 190, the LTE RAN 300 configures the LTE based MTC device 180 to be a MASTER and the LTE based MTC device 190 to be a SLAVE. In this way, the LTE RAN 300 provides control and scheduling for both LTE based MTC devices 180 and 190 by providing control and scheduling for the mPDSCH to be sent from the LTE based MTC device 180 and the mPDSCH to be received by LTE based MTC device 190.

In the above embodiment, a subframe is scheduled for mPDSCH transmission and the LTE based MTC device 180 transmits the mPDSCH with the LTE RAN 300 assigned MTC Demodulation Reference Signal (mDMRS). This signal requires the LTE based MTC devices 180 and 190 to support OFDM signal transmission. In any event, upon the subframe scheduled for mPDSCH being received, the LTE based MTC device 190 receives the mPDSCH using an assigned mDMRS as reference signal for mPDSCH reception and demodulation. An acknowledgement on the reception of an mPDSCH will be sent to the LTE based MTC device 180 by the LTE based MTC device 190 via the LTE RAN 300.

Also, it is envisaged that, during the time and frequency allocation in the subframe that the LTE based MTC device 180 transmits the ePDSCH with low transmit power (i.e. significantly lower than the LTE-RAN 300 transmit power) to the LTE based MTC device 190, the LTE-RAN 300 can utilise this time and frequency location to transmit data to other MTC devices 100 in the same cell, or other cells, without causing interruption to the direct data transfer between the LTE based MTC device 180 and the LTE based MTC device 190.

Referring back to FIGS. 7A and 7B, a method of providing Machine-Type Communication (MTC) for MTC devices over a Long Term Evolution (LTE) wireless communication network from the perspective of the LTE RAN 300 is described. The method comprises allocating a portion of a frequency spectrum of the LTE wireless communication network for the MTC devices to communicate over the LTE wireless communication network, configuring MTC system information comprising channel information for the portion of the frequency spectrum allocated for the MTC devices, and communicating the MTC system information to the MTC devices so that the MTC devices can be configured to transmit and/or receive data over the LTE wireless communication network based on the MTC system information. It can be seen that upon the successful reception of the control information in step 2, the MTC device 100 determines the carrier component and associated radio frame structure for its MTC system information reception. The MTC device then receives system information for further MTC system channel detection and decoding so that data can be transmitted and/or received on the detected channels.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

Throughout the description and claims of this specification, the word "comprise" and variations of the word, such as "comprising" and "comprises", is not intended to exclude other additives, components, integers or steps.

This application is based upon and claims the benefit of priority from Australian Provisional patent application No. 2011904923, filed on Nov. 25, 2011, the disclosure of which is incorporated herein in its entirety by reference.

The invention claimed is:

1. A method implemented in a base station which is used in a wireless communications network providing a machine-type communications (MTC) service and which is provided with a frequency band, comprising:
   allocating a portion of the frequency band for the MTC service; and
   transmitting MTC system information to a first MTC device,
   wherein the MTC system information comprises channel information for the portion of the frequency band,
   wherein the first MTC device communicates according to the channel information,
   wherein the portion of the frequency band is reserved in predetermined resource blocks located within the frequency band for transmission of the MTC system information, and
   wherein the MTC system information is mapped on symbol positions that are determined on the basis of both a system bandwidth (BW) of the frequency band and the number of resource blocks (RB) arranged within the frequency band, and that correspond to the MTC service.

2. The method as claimed in claim 1, wherein the portion of the frequency band comprises a fragmented frequency band.

3. The method as claimed in claim 2, wherein the fragmented frequency band is dedicated for the MTC service.

4. The method as claimed claim 1, wherein data to or from the first MTC device is transmitted on the portion of the frequency band.

5. The method as claimed in claim 1, wherein the MTC system information is transmitted on the portion of the frequency band.

6. The method as claimed in claim 1, wherein the MTC system information comprises MTC cell information indicative of one or more cells of the wireless communications network.

7. The method as claimed in claim 6, wherein the MTC cell information comprises master information block (MIB) information, according to which the first MTC device communicates over the wireless communications network.

8. The method as claimed in claim 1, wherein the portion of the frequency band has a 1.4 MHz bandwidth.

9. The method as claimed in claim 1, wherein the MTC system information further comprises:
   control and scheduling information for a second MTC device.

10. The method as claimed in claim 9, wherein the first MTC device communicates with the second MTC device, according to the control and scheduling information.

11. The method as in claim 10, wherein the control and scheduling information comprises information about whether the second MTC device is a master or a slave.

12. The method as claimed in claim 1, wherein the first MTC device comprises a single antenna.

13. The method as claimed in claim 1, wherein the first MTC device comprises multiple antennas.

14. A method implemented in a machine-type communications (MTC) device used in a wireless communications network providing an MTC service, comprising:
   receiving MTC system information from a base station allocating a portion of a frequency band for a MTC service; and
   communicating according to channel information for the portion of the frequency band,
   wherein the MTC system information comprises the channel information for the portion of the frequency band,
   wherein the portion of the frequency band is reserved in predetermined resource blocks located within the frequency band for transmission of the MTC system information, and
   wherein the MTC system information is mapped on symbol positions that are determined on the basis of both a system bandwidth (BW) of the frequency band and the number of resource blocks (RB) arranged within the frequency band, and that correspond to the MTC service.

15. A wireless communications network providing a machine-type communications (MTC) service, comprising:
   a base station allocating a portion of a frequency band for the MTC service; and
   a MTC device receiving MTC system information from the base station,
   wherein the MTC system information comprises channel information for the portion of the frequency band;

wherein the MTC device communicates according to the channel information, and wherein the portion of the frequency band is reserved in predetermined resource blocks located within the frequency band for transmission of the MTC system information, and wherein the MTC system information is mapped on symbol positions that are determined on the basis of both a system bandwidth (BW) of the frequency band and the number of resource blocks (RB) arranged within the frequency band, and that correspond to the MTC service.

16. A machine-type communications (MTC) device used in a wireless communications network, comprising:

a receiver configured to receive system information necessary for MTC service through a portion of a frequency band determined for the MTC service; and a processor configured to process the system information to produce data through the portion of the frequency band;

wherein the portion of the frequency band is reserved in predetermined resource blocks located within the frequency band for transmission of the MTC system information, and wherein the MTC system information is mapped on symbol positions that are determined on the basis of both a system bandwidth (BW) of the frequency band and the number of resource blocks (RB) arranged within the frequency band, and that correspond to the MTC service.

17. The MTC device as claimed in claim 16, wherein the portion of the frequency band is selected from a system bandwidth of a Long Term Evolution (LTE) wireless communication network.

* * * * *